(No Model.) 5 Sheets—Sheet 1.

J. SHELDON, G. B. LUKIN & H. F. BAKER.
TIRE FOR VEHICLE WHEELS.

No. 456,779. Patented July 28, 1891.

WITNESSES
Charles Bosworth Ketley
Herbert Whitehouse

INVENTORS
John Sheldon.
George Byng Lukin
per Howard Frank Baker.
Lehmann & Pattison
attys

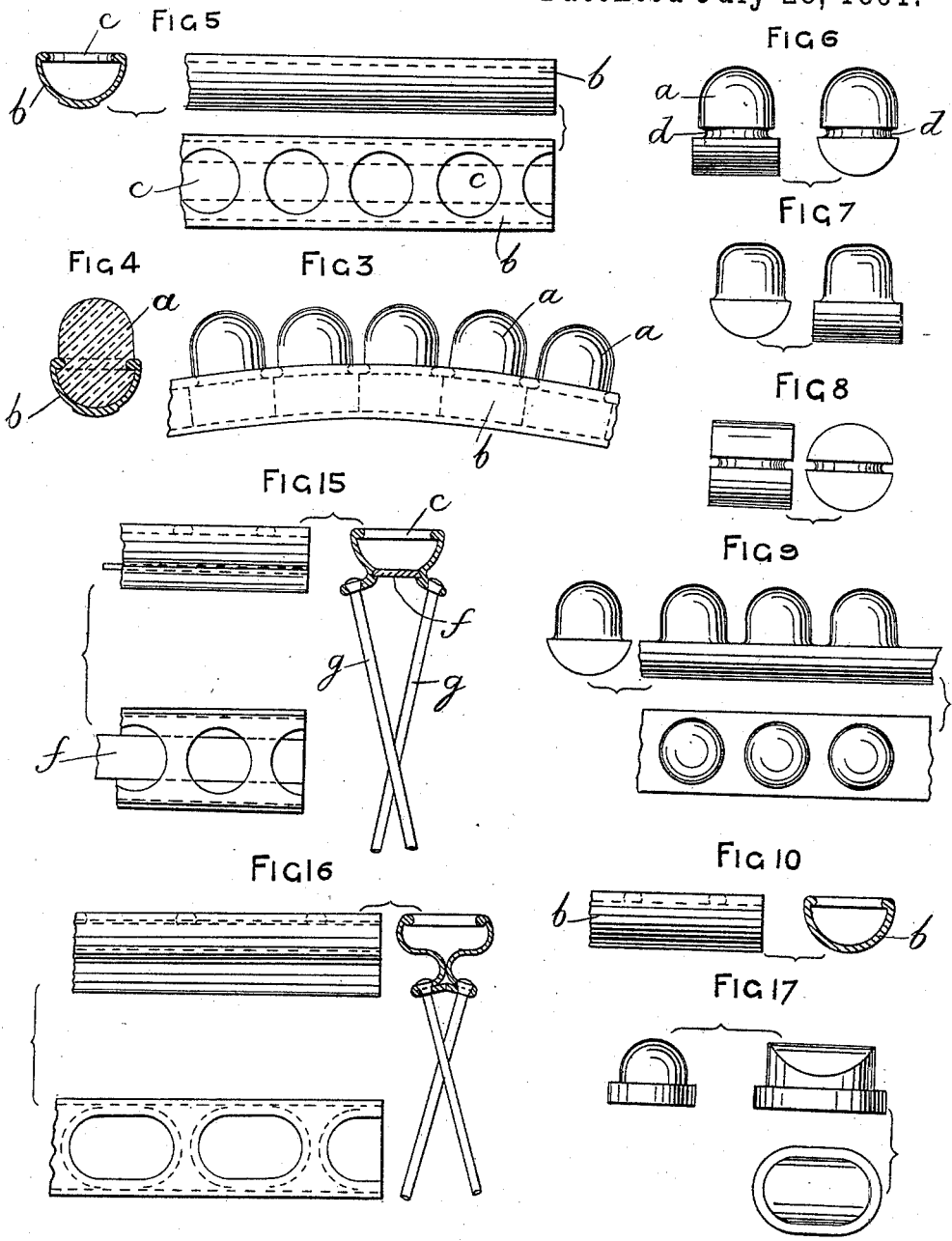

(No Model.) 5 Sheets—Sheet 3.

J. SHELDON, G. B. LUKIN & H. F. BAKER.
TIRE FOR VEHICLE WHEELS.

No. 456,779. Patented July 28, 1891.

WITNESSES
Charles Bosworth Ketley
Herbert Whitehouse

INVENTORS
John Sheldon
George Byng Lukin
Howard Frank Baker
per Lehmann & Pattison, attys.

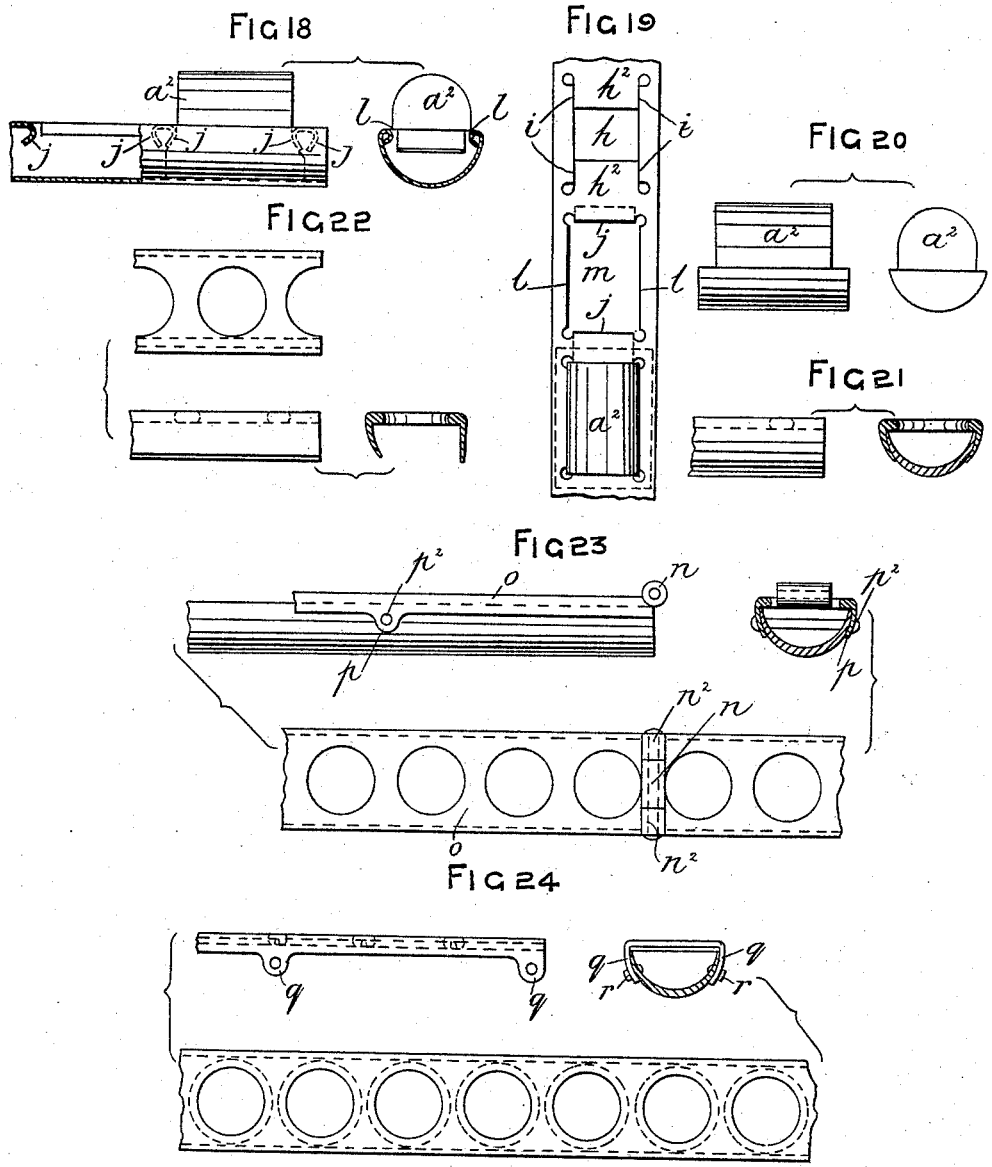

(No Model.) 5 Sheets—Sheet 5.
J. SHELDON, G. B. LUKIN & H. F. BAKER.
TIRE FOR VEHICLE WHEELS.
No. 456,779. Patented July 28, 1891.
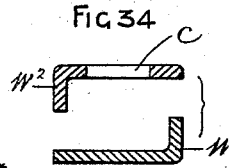
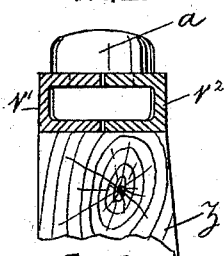
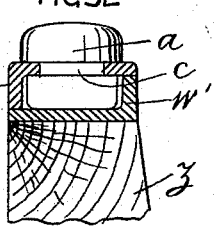
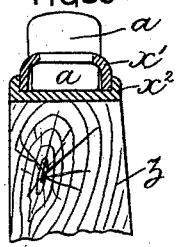
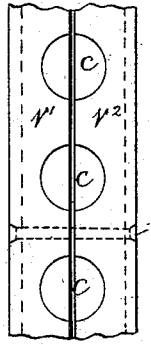
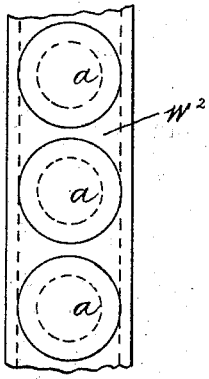
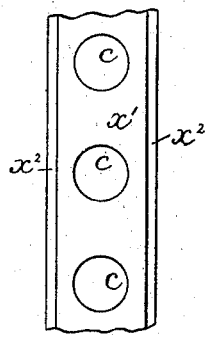
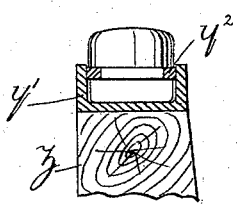
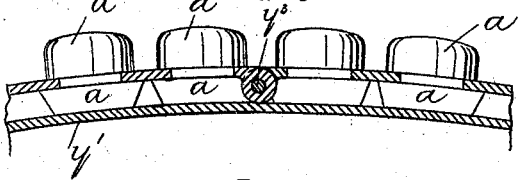
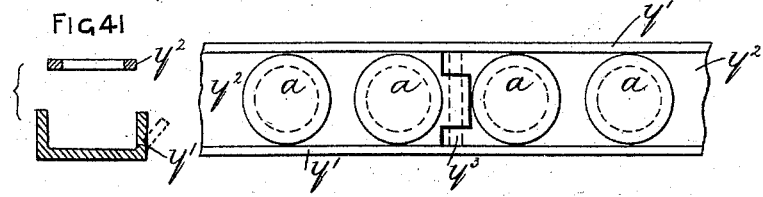
WITNESSES
Charles Bosworth Kelley
Herbert Whitehouse
INVENTORS
John Sheldon
George Byng Lukin
per Howard Frank Baker
Lehmann & Pattison Att'ys

UNITED STATES PATENT OFFICE.

JOHN SHELDON, GEORGE BYNG LUKIN, AND HOWARD FRANK BAKER, OF BIRMINGHAM, ENGLAND.

TIRE FOR VEHICLE-WHEELS.

SPECIFICATION forming part of Letters Patent No. 456,779, dated July 28, 1891.

Application filed December 9, 1890. Serial No. 374,051. (No model.) Patented in England May 16, 1888, No. 7,262.

*To all whom it may concern:*

Be it known that we, JOHN SHELDON, GEORGE BYNG LUKIN, and HOWARD FRANK BAKER, subjects of Her Majesty the Queen of Great Britain, residing at the city of Birmingham, England, have invented certain new and useful Improvements in and Connected with the Wheels of Vehicles, Bicycles, Tricycles, and other Velocipedes, of which the following is a specification, and which was patented in England May 16, 1888, No. 7,262.

This invention consists in the herein-described improved method of making and attaching india-rubber tires to the rims of wheels of vehicles, bicycles, tricycles, and other velocipedes. Instead of employing a continuous ring of india-rubber, we employ a series of detached pieces or studs or short lengths of india-rubber or other elastic substance, which are pressed base forward into holes in the hollow rim of the wheel, where the said bases expand, and are thus secured in place. By making the india-rubber tire in detached pieces, as above described, a better cushion is obtained than when the india-rubber tire is made in a continuous ring, as is usual, and, moreover, any part of the india-rubber tire can very readily be removed and replaced by a new piece when necessary.

Figure 1:
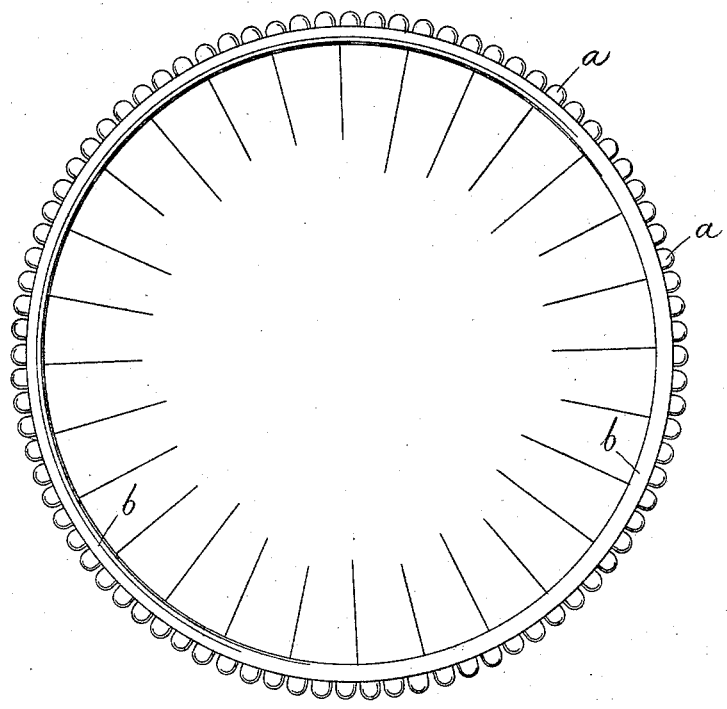
Figure 2:
Figure 11:
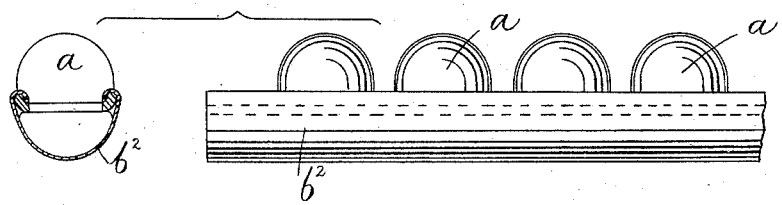
Figure 13:
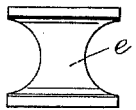
Figure 12:
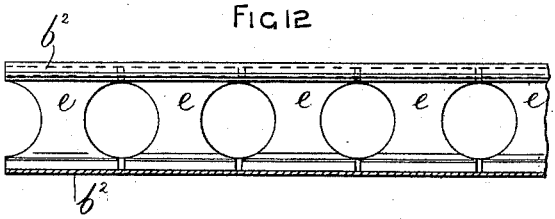
Figure 14:
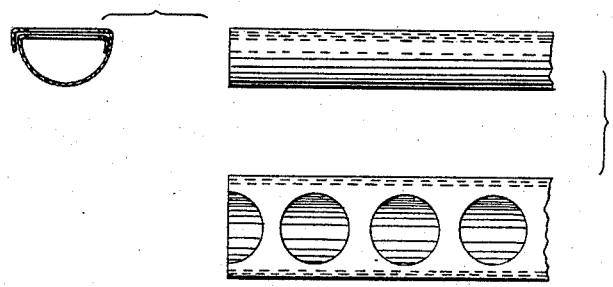
Figure 25:
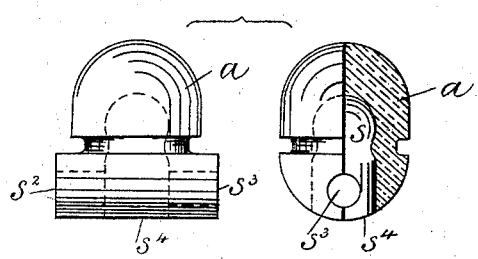
Figure 26:
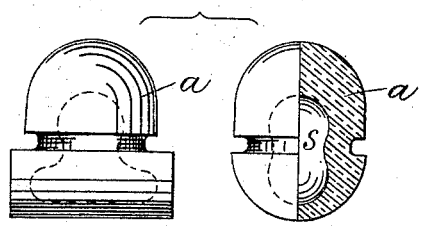
Figures 27, 28:
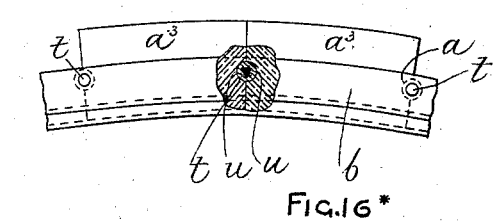
Figure 26:
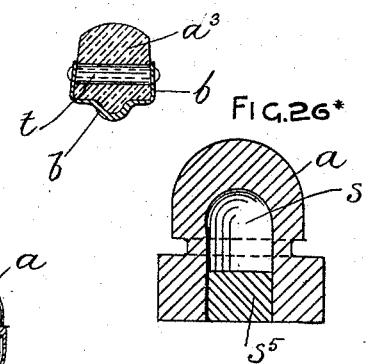
Figure 16:
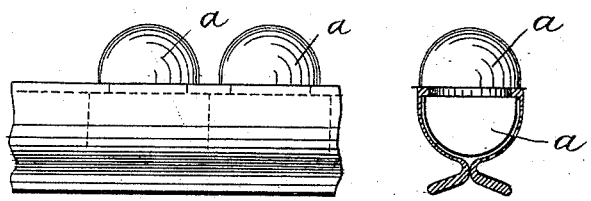

In the accompanying drawings, Figure 1 represents in front elevation, and Fig. 2 in edge view, a wheel-rim and its india-rubber tire constructed according to this invention. Fig. 3 shows in side elevation, and Fig. 4 in cross-section, a part of the same on an enlarged scale. Fig. 5 represents in side elevation and plan of upper side and cross-section a portion of the rim, and Fig. 6 represents one of the pieces of india-rubber of which the tire is made. Figs. 7, 8, and 9 respectively represent modified forms of the said pieces of the india-rubber tire. Fig. 10 represents a modified form of the metal rim. Fig. 11 represents in side elevation and cross-section a further modification of this invention. Fig. 12 is a plan of the upper side of the rim of this modification with the india-rubber pieces removed, and Fig. 13 represents a part of the metallic rim separately. Fig. 14 represents in side elevation, plan, and cross-section a further modification of the said metal rim. Fig. 15 represents in side elevation, plan, and cross-section a further modification of the said rim. Fig. 16 represents similar views of a further modification. Fig. 16* represents a further modification. Fig. 17 represents a further modification of the pieces of india-rubber which form the tire. Fig. 18 represents in side elevation and in cross-section, and Fig. 19 in plan, a further modification of this invention, and Fig. 20 represents one of the pieces of the india-rubber tire of the same separately. Figs. 21 and 22 illustrate a further modification of the said metal rim, and Figs. 23 and 24 each represent further modifications. Figs. 25, 26, and 26* each illustrate a further modification of the pieces of india-rubber forming the tire. Fig. 27 represents in side elevation, and Fig. 28 in cross-section, a further modification of this invention. Figs. 29 and 30 illustrate in cross-section and in plan, respectively, a method of applying our invention to those wheels which have wooden fellies, and Fig. 29* a similar section of a solid rim for the purpose, and Fig. 31 is a cross-section of the metal rim of the same separately. Figs. 32, 33, and 34 illustrate a further modification of our invention as applied to wheels having wooden fellies. Figs. 35, 36, and 37 illustrate a further modification, and Figs. 38, 39, 40, and 41 illustrate a further modification.

In the example illustrated by Figs. 3, 4, 5, and 6 the detached pieces of india-rubber of which the tire is composed are marked $a$, and the metallic rim $b$ is made of a closed tube semi-cylindrical in cross-section with a flat top, the flat top being perforated with holes $c$ at equal distances apart, through which holes the base parts of the pieces of india-rubber $a$ are passed. Each of the pieces of india-rubber $a$ (one of which is shown separately in Fig. 6) has a groove $d$ at about its middle, the lower part of the said india-rubber piece having a semi-cylindrical figure and fitting in the semi-cylindrical rim $b$. The upper half of the india-rubber piece constitutes the bearing part or tire proper and has a dome figure. The edge of the holes $c$ in the top of the rim $b$ constitutes flanges, (see the cross-section Fig. 4,)

under which the shoulder at $d$ of the pieces of india-rubber spring when the said pieces are pressed into the rim.

The pieces or lengths of india-rubber may have the shapes represented in Figs. 7, 8, and 9—that is to say, the top of the piece in Fig. 7 is nearly oblong or square and the upper and lower parts of the piece, Fig. 8, have the same figure—so that when one half is worn it can be reversed and the worn half used outward. In Fig. 9 a long piece is used, having a series of nearly dome-shaped (or other shaped) projections upon it. In this case a series of rectangular openings is made in the top of the rim. The bottom of the semi-cylindrical trough of the rim $b$ may either be strengthened at the part where the spokes are to be fixed to it, as seen in Figs. 4 and 5, or the bottom of the rim need not be strengthened, as represented in Fig. 10. The top of the semi-cylindrical rim $b$ may be made separate from the trough-shaped part, as represented in Figs. 11, 12, and 13. This rim consists of a trough-shaped part $b^2$ and a series of separate distance-pieces $e$, (one of which is shown in Fig. 13,) of a shape to fit in the trough between the india-rubber pieces $a$. The edges of the distance-pieces $e$ are turned upwardly and engage with the edges of the trough-shaped part $b^2$, which are turned inwardly, (see the cross-section Fig. 11;) or, as shown by Fig. 14, the metallic rim may be made of a semi-cylindrical tube, which is open instead of being closed. In this case the meeting edges of the tube are lapped over each other, so as to make the flat perforated top part of double thickness, as shown in the cross-section, Fig. 14, and brazed, if necessary; or the metallic rim may be made with elastic sides, as represented in Fig. 15. This rim has a separate bottom-closing plate $f$, the elastic sides being pressed together and held in their places by the spokes $g$ $g$ of the wheel connected to the flanges on the said elastic sides of the rim; or the rim may have the form represented by Fig. 16. In this modification the holes in the top of the rim in which the pieces of india-rubber fit are represented as oblong to suit india-rubber pieces or studs of the kind shown by Fig. 17 to form the tire; or the rim may have the form represented by Fig. 16*, in which the flanges for the spokes and the flat perforated top of the rim are made of extra thickness, so as to be of the same strength as the sides.

The flanges or edges of the holes or openings in the rim for retaining the india-rubber studs or pieces in the said rim may be made in the manner illustrated in Figs. 18 and 19. In this modification the rectangular openings are cut in the top of the rim-tube, as seen at $h$, Fig. 19, and longitudinal piercings are made at $i$ $i$. The parts $h^2$ $h^2$ are bent inward to form the retaining-flanges $j$ $j$ for the india-rubber studs, (see Fig. 18,) and the piercings at $i$ $i$ are bent inward to give rounded edges $l$ $l$ to the longer sides of the openings. After the flanges $j$ $j$ and rounded edges $l$ $l$ have been made the opening has the form represented at $m$, Fig. 19. The india-rubber studs $a^2$, to be used with this form of rim, have the shape represented in Fig. 20, or the rim may be made of two longitudinal pieces having the sectional figures represented in side elevation and cross-section in Fig. 21 and the top portion detached in section, side elevation, and plan in Fig. 22. When the rim-tube is made in two pieces, the lengths of which the top portion is made may be connected together and to the lower portion in the manner represented in cross-section, side elevation, and plan in Fig. 23. For this purpose a middle knuckle or eye $n$ is made at the end of one length $o$ and side knuckles $n^2$ $n^2$ at the end of the adjacent length. By passing a pin through the engaged knuckles and riveting it the two pieces are connected together. By means of lugs $p$ $p$ on opposite sides of the lengths of the top part of the rim and a cross-riveted pin $p^2$ the said lengths are connected to the lower half of the rim, or each length of the top portion of the rim may be provided with two pairs of lugs $q$ $q$, as represented in cross-section and plan in Fig. 24, and the two portions be connected to the lower portions of the rim by means of set-screws at $r$, passed through the said lugs and screwed into the said lower portion of the rim, as seen in the cross-section. The said india-rubber pieces or studs forming the tire proper may either be solid or they may be hollow, this hollow space either communicating with the exterior or not. Two of these hollow studs of india-rubber are represented by Figs. 25, 26, and 26*, by which it will be seen that each has an internal cavity $s$, which in Fig. 25 communicates with the outside by holes $s^2$ $s^3$ $s^4$ in the base, and in Figs. 26 and 26* the cavity is wholly inclosed and may contain air under pressure.

In the example shown by Fig. 26* the inclosed cavity $s$ is made by first forming an open cavity, as in Fig. 25, and then plugging up the open end $s^4$ by a piece $s^5$. The other forms of india-rubber pieces or studs hereinbefore or hereinafter described and illustrated on the accompanying drawings may similarly be made hollow. By making the india-rubber pieces or studs hollow, as above described, a better cushion is obtained than when made solid and there is a saving of india-rubber.

In the modification illustrated by Figs. 27 and 28 the upper part of the metal rim $b$ is dispensed with—that is to say, the rim $b$ is trough-shaped with inclined sides contracted at its outer edge, as represented; and situated within and crossing the trough-rim $b$ at equal distances apart are tubes or rods $t$, riveted in their places; and the sides of the pieces of india-rubber $a^3$, of which the tire is composed, are inclined similarly to the sides of the rim $b$, and in the ends of the said pieces $a^3$ are semi-cylindrical depressions $u$, corresponding with the tubes or rods $t$, so that when the short pieces of india-rubber $a^3$ are pressed base forward into the trough the depressions $u$ $u$ will spring upon and engage with the cross rods or tubes $b$ $b$, thereby effectually retaining the said india-rubber lengths in the rim.

In applying our invention to those wheels which are made with wooden fellies bound together by a metallic rim usually shrunk thereon we make this rim of a hollow form to hold the bases of the said india-rubber studs $a$. This can be accomplished in various ways—for instance, as illustrated by Figs. 29, 30, and 31, where the said rim consists of two channel-section rings $v'$ $v^2$, side by side, their two channels being toward each other, so as together to form the hollow rim to take the enlarged bases of the india-rubber studs $a$, which are pressed therein through the holes $c$, half in one ring and half in the other, after the rings $v'$ $v^2$ have been shrunk onto the fellies $z$. The rings $v'$ $v^2$ may be secured together by cross-bolts or rivets $v^3$ at intervals, and they may be also bolted or riveted to the fellies; or a flat-sided tube, (see Fig. 29*,) drilled at intervals at $c$ for the india-rubber pieces $a$, may be used instead of the two channel-rings $v'$ $v^2$; or two L-section rings $w'$ $w^2$ may be used, as shown in Figs. 32, 33, and 34, the ring $w^2$ fitting onto the ring $w'$, as shown in Fig. 32, and thus forming the trough for the bases of the india-rubber studs $a$, which are forced through the holes $c$ in the outer ring $w^2$; or two channel-section rings $x'$ $x^2$ may, as shown in Figs. 35, 36, and 37, be used to form the trough-section rim. In this case the outer ring $x'$ is made small enough to fit in the channel of the ring $x^2$, which latter is shrunk on or otherwise fixed to the fellies with its channel outwardly. The outer ring $x'$, in which are the holes $c$ for the india-rubber pieces $a$, is by preference made in sections or with a joint to facilitate getting it around the other ring $x^3$, and it is then secured by screws passing through both rings into the fellies $z$; or the ring $x'$ may be made whole and expanded by heat to get it in place around the other ring $x^2$; or, as shown by Figs. 38, 39, 40, and 41, the trough-section rim may consist of a channel-section ring $y'$, shrunk or otherwise secured to the fellies $z$ with its channel outwardly, and a flat-section ring $y^2$, fitting in the said channel, this flat-section ring $y^2$ having the holes $c$ to take the india-rubber pieces $a$, the enlarged bases of which fit in the said channel.

The ring $y^2$ can be made whole and expanded by heat to get it in place in the channel, or the channel-bar $y'$ can be rolled with one side bent outwardly, as shown by dotted lines in Fig. 41, and then bent up to its proper shape after the ring $y^2$ has been placed in the channel; or the ring $y^2$ may be divided at one or more parts and the ends secured together by any convenient means, such as by each end having an eye, as shown in Figs. 38 and 40, or these eyes fitting and being secured together by cross-pin $y^3$.

What we claim as our invention, and desire to secure by Letters Patent, is—

1. The improved tubular metallic wheel-rim formed of a tube and perforated on its periphery with holes adapted to receive a series of detached pieces or short lengths of india-rubber to form the tire proper, substantially as described.

2. The improved tubular metallic wheel-rim formed of two rings either whole or in segments, together constituting a tubular ring and perforated on its periphery with holes adapted to receive a series of detached pieces or short lengths of india-rubber to form the tire proper, substantially as described.

3. An improved wheel-tire composed of a hollow metallic tire having rigid transverse portions above its bottom, and a series of detached pieces of india-rubber or other elastic substance having one end to fit and rest on the bottom of the tire and its opposite end projecting and forming the periphery of the tire, the said detached pieces having contracted necks between their ends which are engaged by the said transverse portions, the parts combined substantially as shown.

4. The improved wheel-tire composed of a series of hollow detached pieces or short lengths of india-rubber or other elastic substance furnished with contracted necks or enlarged bases or with contracted necks and enlarged bases, so as to engage with a hollow wheel-rim when forced therein from the outside, substantially as hereinbefore described.

5. In combination, a tubular metallic wheel-rim perforated on its periphery, spokes connected to said rim and to a central hub, and a series of detached pieces or short lengths of india-rubber or other elastic substance partly contained within the said wheel-rim and projecting through the said perforations, substantially as described, and for the purpose specified.

6. In combination, a perforated flat-sided tubular metallic wheel-rim, shrunk around and secured to the wooden fellies of a wheel, and a series of detached pieces or short lengths of india-rubber or other elastic substance held in the said perforations and constituting the elastic tire of the wheel, substantially as hereinbefore described.

7. In combination, a perforated flat-sized tubular metallic wheel-rim formed of two channel-section rings shrunk around and secured to the wooden fellies of a wheel, and a series of detached pieces or short lengths of india-rubber or other elastic substance held in the said perforations and constituting the elastic tire of the wheel, substantially as hereinbefore described.

8. In combination, a metallic wheel-rim shrunk around and secured to the wooden fellies of a wheel, a perforated metallic ring, either whole or in segments, fitting around and engaging with said rim, and a series of detached pieces or short lengths of india-rubber or other elastic substance held in the said perforations and constituting the elastic tire of the wheel, substantially as hereinbefore described.

In testimony whereof we have each signed in the presence of two subscribing witnesses.

JOHN SHELDON.
GEORGE BYNG LUKIN.
HOWARD FRANK BAKER.

Witnesses:
CHARLES BOSWORTH KETLEY,
HERBERT WHITEHOUSE.